US009609346B2

(12) United States Patent
Lin et al.

(10) Patent No.: US 9,609,346 B2
(45) Date of Patent: Mar. 28, 2017

(54) METHOD AND APPARATUS FOR DERIVING TEMPORAL MOTION VECTOR PREDICTION

(75) Inventors: Jian-Liang Lin, Yilan (TW); Yu-Pao Tsai, Kaohsiung (TW); Yi-Wen Chen, Taichung (TW); Jicheng An, Beijing (CN); Yu-Wen Huang, Taipei (TW); Shaw-Min Lei, Hsinchu (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 294 days.

(21) Appl. No.: 13/236,422

(22) Filed: Sep. 19, 2011

(65) Prior Publication Data

US 2012/0236942 A1   Sep. 20, 2012

Related U.S. Application Data

(60) Provisional application No. 61/452,531, filed on Mar. 14, 2011.

(30) Foreign Application Priority Data

Sep. 15, 2011   (CN) .................. PCT/CN2011/079674

(51) Int. Cl.
  *H04N 19/56*   (2014.01)
  *H04N 19/513*   (2014.01)
  (Continued)

(52) U.S. Cl.
  CPC ........... *H04N 19/513* (2014.11); *H04N 19/52* (2014.11); *H04N 19/56* (2014.11); *H04N 19/57* (2014.11); *H04N 19/583* (2014.11)

(58) Field of Classification Search
  CPC .................................. H04N 7/32; H04N 19/52
  (Continued)

(56) References Cited

U.S. PATENT DOCUMENTS 5,745,183 A  4/1998  Lam
6,298,086 B1  10/2001  Suzuki
(Continued)

FOREIGN PATENT DOCUMENTS

CN  1149233 A  5/1998
CN  1444406 A * 9/2003
(Continued)

OTHER PUBLICATIONS

"Samsung's Response to the Call for Proposals on Video Compression Technology", McCann et al., Document JCTVC-A124, Joint Collaborative Team on Video Coding (JCT-VC) of ITU-T SG16 WP3 and ISO/IEC JTC1/SC29/WG1, 1st Meeting: Dresden, Germany, Apr. 15-23, 2010.

(Continued)

*Primary Examiner* — Jay Patel
*Assistant Examiner* — Irfan Habib
(74) *Attorney, Agent, or Firm* — McClure, Qualey & Rodack, LLP

(57) ABSTRACT

A method and apparatus for deriving a temporal motion vector predictor (MVP) are disclosed. The MVP is derived for a current block of a current picture in Inter, or Merge, or Skip mode based on co-located reference blocks of a co-located block and a flag is used to indicate the co-located picture. More than one co-located reference blocks can be used to derive the temporal MVP and the co-located reference blocks can be selected from the co-located block as well as neighboring blocks of the co-located block. A search set comprises search motion vectors associated with the co-located reference block(s) is formed. The search motion vector (MV) corresponding to the co-located reference block in the same reference list is searched before the search MV in a different reference list. Various schemes to accommo- (Continued)

date implicit method of deriving co-located picture are also disclosed.

35 Claims, 8 Drawing Sheets

(51) Int. Cl.
  *H04N 19/52* (2014.01)
  *H04N 19/57* (2014.01)
  *H04N 19/583* (2014.01)

(58) Field of Classification Search
  USPC .......................................................... 375/240
  See application file for complete search history.

(56) References Cited

U.S. PATENT DOCUMENTS

| | | | | |
|---|---|---|---|---|
| 7,233,621 | B2* | 6/2007 | Jeon | H04N 19/521 |
| | | | | 375/240.15 |
| 8,774,279 | B2* | 7/2014 | Kim | H04N 19/52 |
| | | | | 375/240.12 |
| 8,848,805 | B2* | 9/2014 | Sugio | H04N 19/52 |
| | | | | 375/240.25 |
| 9,088,799 | B2* | 7/2015 | Wahadaniah | H04N 19/52 |
| 9,185,428 | B2* | 11/2015 | Lou | H04N 19/52 |
| 9,300,963 | B2* | 3/2016 | Lin | H04N 19/52 |
| 9,307,239 | B2* | 4/2016 | Lin | H04N 19/52 |
| 9,313,494 | B2* | 4/2016 | Zheng | H04N 19/105 |
| 9,319,657 | B2* | 4/2016 | Kang | H04N 13/0048 |
| 9,357,195 | B2* | 5/2016 | Chen | H04N 19/597 |
| 9,357,214 | B2* | 5/2016 | Zhang | H04N 19/597 |
| 9,392,299 | B2* | 7/2016 | Lim | H04N 19/577 |
| 9,451,281 | B2* | 9/2016 | Lim | H04N 19/52 |
| 9,479,778 | B2* | 10/2016 | Chen | H04N 19/52 |
| 9,485,515 | B2* | 11/2016 | Xu | H04N 19/46 |
| 9,485,517 | B2* | 11/2016 | Chen | H04N 19/513 |
| 2003/0133512 | A1* | 7/2003 | Moni | H04N 19/176 |
| | | | | 375/246 |
| 2003/0142749 | A1 | 7/2003 | Hong | |
| 2004/0105589 | A1 | 6/2004 | Kawaharada et al. | |
| 2004/0234143 | A1 | 11/2004 | Hagai et al. | |
| 2004/0258154 | A1* | 12/2004 | Liu | H04N 19/56 |
| | | | | 375/240.16 |
| 2006/0120612 | A1* | 6/2006 | Manjunath et al. | 382/236 |
| 2006/0245497 | A1* | 11/2006 | Tourapis | H04N 19/56 |
| | | | | 375/240.16 |
| 2007/0019730 | A1 | 1/2007 | Han | |
| 2007/0110161 | A1* | 5/2007 | Saigo | H04N 19/56 |
| | | | | 375/240.16 |
| 2008/0037639 | A1* | 2/2008 | Jeon | H04N 19/521 |
| | | | | 375/240.15 |
| 2008/0069234 | A1* | 3/2008 | Kadono | G06F 1/03 |
| | | | | 375/240.16 |
| 2008/0101474 | A1* | 5/2008 | Chiu | H04N 19/176 |
| | | | | 375/240.24 |
| 2009/0304084 | A1 | 12/2009 | Hallapuro et al. | |
| 2009/0323801 | A1* | 12/2009 | Imajou | H04N 21/431 |
| | | | | 375/240.01 |
| 2010/0195721 | A1* | 8/2010 | Wu | H04N 19/159 |
| | | | | 375/240.12 |
| 2010/0215101 | A1 | 8/2010 | Jeon et al. | |
| 2011/0293012 | A1* | 12/2011 | Au | H04N 19/52 |
| | | | | 375/240.16 |
| 2012/0008688 | A1* | 1/2012 | Tsai | H04N 19/52 |
| | | | | 375/240.16 |
| 2012/0134416 | A1* | 5/2012 | Lin | H04N 19/52 |
| | | | | 375/240.16 |
| 2012/0219064 | A1* | 8/2012 | Zheng | H04N 19/105 |
| | | | | 375/240.16 |
| 2012/0263231 | A1* | 10/2012 | Zhou | H04N 19/52 |
| | | | | 375/240.12 |
| 2013/0022127 | A1* | 1/2013 | Park | H04N 19/52 |
| | | | | 375/240.16 |
| 2013/0308704 | A1* | 11/2013 | Park | H04N 19/51 |
| | | | | 375/240.16 |

FOREIGN PATENT DOCUMENTS

| | | |
|---|---|---|
| CN | 1505900 | 6/2004 |
| CN | 1960496 A | 5/2007 |
| CN | 101431681 | 5/2009 |
| CN | 101653008 | 2/2010 |
| CN | 101018338 | 8/2010 |
| JP | 2002354503 A | 12/2002 |
| JP | 2003244707 A | 8/2003 |
| KR | 100746006 B1 | 8/2007 |
| KR | 100883025 B1 | 2/2009 |

OTHER PUBLICATIONS

International Search Report and Written Opinion of corresponding PCT/CN2011/079674 application.

Jian-Liang Lin, et al., "CE9: Results of Experiments M-Series", Joint Collaborative Team on Video Coding (JCT-VC) of ITU-T SG16 WP3 and ISO/IEC JTC1/SC29/WG11 5th Meeting: Geneva, CH, Mar. 16-23, 2011, Document: JCTVC-E048.

J. Jung et al, Description of Core Experiment 9: MV Coding and Skip/Merge operations, Joint Collaborative Team on Video Coding (JCT-VC) of ITU-T SG16 WP3 and ISO/IEC JTC1/SC29/WG11 4th Meeting, Jan. 20-28, 2011, pp. 1-11, Document: JCTVC-D609 WG11 No. m19489, XP030048051, Daegu, KR.

Jian-Liang Lin et al, Improved Advanced Motion Vector Prediction, Joint Collaborative Team on Video Coding (JCT-VC) of ITU-T SG16 WP3 and ISO/IEC JTC1/SC29/WG11 4th Meeting, Jan. 20-28, 2011, pp. 1-8, Document: JCTVC-D125, XP030047446, Daegu, KR.

Lin, et al.: "Improved Advanced Motion Vector Prediction"; Joint Collaborative Team on Video Coding (JCT-VC) of ITU-T SG16 WP3 and ISO/IEC JTC1/SC29/WG11; 4th Meeting: Daegu, KR, Jan. 20-28, 2011; pp. 1-8.

Zhou, et al.: CE9: Simplified AMVP design (SP06S1, SP06S2); oint Collaborative Team on Video Coding (JCT-VC) of ITU-T SG16 WP3 and ISO/IEC JTC1/SC29/WG11; 6th Meeting: Torino, IT, Jul. 14-22, 2011; pp. 1-12.

Francois, E., et al.; "Robust solution for the AMVP parsing issue:" Joint Collaborative Team on Video Coding (JCT-VC) of ITU-T SG16 WP3 and ISO/IEC JTC1/SC29WG11; Mar. 2011; pp. 1-7.

* cited by examiner

METHOD AND APPARATUS FOR DERIVING TEMPORAL MOTION VECTOR PREDICTION

CROSS REFERENCE TO RELATED APPLICATIONS

The present invention claims priority to U.S. Provisional Patent Application, No. 61/452,531, filed Mar. 14, 2011, entitled "New Derivation Method for Temporal Motion Vector Predictor" and PCT Patent Application, Ser. No. PCT/CN2011/079674, filed Sep. 15, 2011, entitled "Method and Apparatus for Deriving Temporal Motion Vector Prediction". The present invention is related to U.S. Non-Provisional patent application Ser. No. 13/206,891. Filed Aug. 10, 2011, entitled "Method and Apparatus for Derivation of MV/MVP Candidate for Inter/Skip/Merge Modes" and U.S. Non-Provisional patent application Ser. No. 13/177,808, filed Jul. 7, 2011, entitled "Method and Apparatus for Derivation of Spatial Motion Vector Candidate and Motion Vector Prediction Candidate". The U.S. Provisional patent application, PCT patent application and US Non-Provisional patent applications are hereby incorporated by reference in their entireties.

FIELD OF THE INVENTION

The present invention relates to video coding. In particular, the present invention relates to coding techniques associated with derivation of temporal motion vector candidate and motion vector prediction candidate.

BACKGROUND

In video coding systems, spatial and temporal redundancy is exploited using spatial and temporal prediction to reduce the information to be transmitted. The spatial and temporal prediction utilizes decoded pixels from the same picture and reference pictures respectively to form prediction for current pixels to be coded. In a conventional coding system, side information associated with spatial and temporal prediction may have to be transmitted, which will take up some bandwidth of the compressed video data. The transmission of motion vectors for temporal prediction may require a noticeable portion of the compressed video data, particularly in low-bitrate applications. To further reduce the bitrate associated with motion vectors, a technique called Motion Vector Prediction (MVP) has been used in the field of video coding in recent years. The MVP technique exploits the statistic redundancy among neighboring motion vectors spatially and temporally. In the rest of this document, MVP may sometimes denote "motion vector prediction" and sometimes denote "motion vector predictor" according to contexts.

In High-Efficiency Video Coding (HEVC) development, a technique named Advanced Motion Vector Prediction (AMVP) is currently being considered by the standard body. The AMVP technique uses explicit predictor signaling to indicate the MVP selected from a MVP candidate set. In HEVC test model version 2.0 (HM-2.0), the MVP candidate set of AMVP includes spatial MVPs as well as a temporal MVP, where the spatial MVPs include two MVPs selected from two respective neighboring groups of the current block. The temporal MVP is derived based on motion vectors from a respective area of a reference picture by mapping the current block from the current picture to the reference picture. The respective area, i.e., the co-located block, in the reference picture may not have the same block size (prediction unit (PU) size) as the current block. When the respective area uses smaller block sizes than the current block, one of the blocks in the co-located block is selected as a co-located reference block. In HM-2.0, the temporal predictor is associated with the center block of the respective area while the previous version of HM uses the above-left reference block of the co-located block. If the MV for the co-located reference block does not exist, the temporal MVP is not available. It is desirable to develop an MVP derivation scheme that can improve the availability of the MVP from the neighboring blocks. The improved MVP derivation scheme may result in smaller motion vector residues and, consequently, better coding efficiency. Furthermore, it is desirable that the MVP derivation scheme will allow the MVP candidate to be derived at the decoder based on decoded information so that no additional side information has to be transmitted.

BRIEF SUMMARY OF THE INVENTION

A method and apparatus for deriving a motion vector predictor (MVP) for a MV of a current block in Merge, Inter, or Skip mode are disclosed. In one embodiment according to the present invention, the method and apparatus for deriving a motion vector predictor (MVP) for a MV of a current block in Inter, or Merge, or Skip mode comprise: selecting a co-located block corresponding to a co-located picture; receiving one or more reference MVs (motion vectors) of one or more co-located reference blocks associated with the co-located block; determining a search set and determining a search order for the search set; determining the MVP for the current block based on the search set and the search order; and providing the MVP for the current block. The search set comprises one or more search MVs associated with the co-located reference blocks, and wherein each co-located reference block is associated with one or more search MVs.

One aspect of the present invention is related to configuration of the co-located reference blocks and the corresponding search set for determining the MVP. In one embodiment according to the present invention, the co-located reference blocks comprise an inside co-located block inside the co-located block, an outside co-located block outside the co-located block, or both the inside co-located block and the outside co-located block. For example, the center block of the co-located block can be selected as the inside co-located block. In another example, the outside co-located block is located outside the co-located block and across from a lower-right corner of the co-located block. In one embodiment, the search MVs comprise first search MVs crossing the current picture and second search MVs associated with the co-located picture in the given reference list, then third search MVs associated with the co-located picture in the other reference list.

Another aspect of the present invention is related to the search order for determining the MVP. In one embodiment according to the present invention, the search MV associated with the co-located picture in the same reference list as the current picture has higher search priority than the search MV associated with the co-located picture in the other reference list. In another embodiment according to the present invention, the search MV crossing the current picture has higher search priority than other search MVs. The search for determining the MVP can be firstly performed over search MVs associated with each co-located reference block or over the co-located reference blocks for each search MV. In yet another embodiment according to the present invention, the MVP found is compared with a previous MVP. If the MVP found is the same as the previous MVP, the MVP search continues. If the search finds no MVP through the search set, the MVP is set to zero, a default value or a pre-determined value, or removed from a candidate set of MVPs.

Yet another aspect of the present invention is related to the selection of the co-located picture for determining the MVP. Information associated with a flag indicating the co-located picture can be incorporated in sequence level, picture level, or slice level. The co-located picture associated with the co-located block can be derived according to an implicit method or an explicit method as indicated by the flag. In one embodiment according to the present invention, when the implicit method is used, the selection method for the co-located picture associated with the co-located block can be determined according to the given reference list, such as a reference list different from the given reference list. In another embodiment according to the present invention, when the implicit method is used, the selection method for the co-located picture can be based on temporal distance associated with the reference MVs, such as the reference MV with the shortest temporal distance. The selection method for the co-located picture may also be based on a picture type of the co-located picture, a layer of the co-located picture in a hierarchical group of pictures (GOP), or a picture order of the co-located picture in a GOP, or the picture order of the co-located picture in a same layer as the hierarchical GOP.

DETAILED DESCRIPTION OF THE INVENTION

Figure 1:
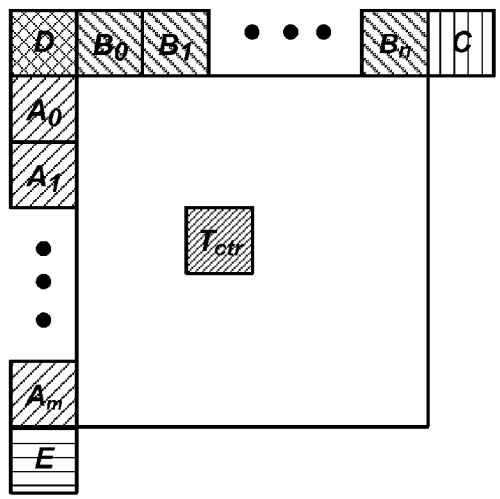
FIG. 1 illustrates neighboring block and co-located block configuration for deriving spatial/temporal motion vector prediction candidate set for Inter and Skip modes according to High Efficiency Video Coding.

In video coding systems, the spatial and temporal redundancy is exploited using spatial and temporal prediction to reduce the bitrate to be transmitted or stored. The spatial prediction utilizes decoded pixels from the same picture to form prediction for current pixels to be coded. The spatial prediction is often operated on a block by block basis, such as the 16×16 or 4×4 block for luminance signal in H.264/AVC Intra coding. In video sequences, neighboring pictures often bear great similarities, and simply using picture differences can effectively reduce the transmitted information associated with static background areas. Nevertheless, moving objects in the video sequence may result in substantial residues and will require higher bitrate to code the residues. Consequently, Motion Compensated Prediction (MCP) is often used to exploit temporal correlation in video sequences.

Motion compensated prediction can be used in a forward prediction fashion, where a current picture block is predicted using a decoded picture or pictures that are prior to the current picture in the display order. In addition to forward prediction, backward prediction can also be used to improve the performance of motion compensated prediction. The backward prediction utilizes a decoded picture or pictures after the current picture in the display order. Since the first version of H.264/AVC was finalized in 2003, forward prediction and backward prediction have been extended to list 0 prediction and list 1 prediction, respectively, where both list 0 and list 1 can contain multiple reference pictures prior to or/and later than the current picture in the display order. The following describes the default reference picture list configuration. For list 0, reference pictures prior to the current picture have lower reference picture indices than those later than the current picture. For list 1, reference pictures later than the current picture have lower reference picture indices than those prior to the current picture. For both list 0 and list 1, after applying the previous rules, the temporal distance is considered as follows: a reference picture closer to the current picture has a lower reference picture index. To illustrate the list 0 and list 1 reference picture configuration, the following example is provided where the current picture is picture 5 and pictures 0, 2, 4, 6, and 8 are reference pictures, where the numbers denote the display order. The list 0 reference pictures with ascending reference picture indices and starting with index equal to zero are 4, 2, 0, 6, and 8. The list 1 reference pictures with ascending reference picture indices and starting with index equal to zero are 6, 8, 4, 2, and 0. The first reference picture having index 0 is called co-located picture, and in this example with picture 5 as the current picture, picture 6 is the list 1 co-located picture, and picture 4 is the list 0 co-located picture. When a block in a list 0 or list 1 co-located picture has the same block location as the current block in the current picture, it is called a list 0 or list 1 co-located block, or called a co-located block in list 0 or list 1. The unit used for motion estimation mode in earlier video standards such as MPEG-1, MPEG-2 and MPEG-4 is primarily based on macroblock. For H.264/AVC, the 16×16 macroblock can be segmented into 16×16, 16×8, 8×16 and 8×8 blocks for motion estimation. Furthermore, the 8×8 block can be segmented into 8×8, 8×4, 4×8 and 4×4 blocks for motion estimation. For the High-Efficiency Video Coding (HEVC) standard under development, the unit for motion estimation/compensation mode is called Prediction Unit (PU), where the PU is hierarchically partitioned from a maximum block size. The MCP type is selected for each slice in the H.264/AVC standard. A slice that the motion compensated prediction is restricted to the list 0 prediction is called a P-slice. For a B-slice, the motion compensated prediction also includes the list 1 prediction in addition to the list 0 prediction.

In video coding systems, motion vectors (MVs) and coded residues are transmitted to a decoder for reconstructing the video at the decoder side. Furthermore, in a system with flexible reference picture structure, the information associated with the selected reference pictures may also have to be transmitted. The transmission of motion vectors may require a noticeable portion of the overall bandwidth, particularly in low-bitrate applications or in systems where motion vectors are associated with smaller blocks or higher motion accuracy. To further reduce the bitrate associated with motion vector, a technique called Motion Vector Prediction (MVP) has been used in the field of video coding in recent years. In this disclosure, MVP may also refer to Motion Vector Predictor and the abbreviation is used when there is no ambiguity. The MVP technique exploits the statistic redundancy among neighboring motion vectors spatially and temporally. When MVP is used, a predictor for the current motion vector is chosen and the motion vector residue, i.e., the difference between the motion vector and the predictor, is transmitted. The motion vector residue is usually termed motion vector difference (MVD) as well. The MVP scheme can be applied in a closed-loop arrangement where the predictor is derived at the decoder based on decoded information and no additional side information has to be transmitted. Alternatively, side information can be transmitted explicitly in the bitstream to inform the decoder regarding the motion vector predictor selected.

In HEVC being developed, some improvements of motion vector prediction over the H.264/AVC are being considered. For Inter and Skip modes in HEVC test model version 2.0 (HM-2.0), multiple spatial MVPs are joined with a temporal MVP for selecting a final MVP for the current block. For Merge mode in HM-2.0, multiple spatial MVPs are also joined with a temporal MVP for selecting a final MVP for the current block. In Merge and Skip modes, the final MVPs are the final MVs because their MVDs are zero by definition. In HM-2.0, the Inter and Skip modes utilize an Advanced Motion Vector Prediction (AMVP) algorithm to select one final motion vector predictor (MVP) within a candidate set of MVPs. The AMVP is proposed by McCann et al., entitled "Samsung's Response to the Call for Proposals on Video Compression Technology", Document JCTVC-A124, Joint Collaborative Team on Video Coding (JCT-VC) of ITU-T SG16 WP3 and ISO/IEC JTC1/SC29/WG1, 1st Meeting: Dresden, Germany, 15-23 Apr. 2010. The index of the selected MVP is transmitted. In the Skip mode of HM-2.0, the reference index will always be set to 0. In the Inter mode, the reference index is explicitly transmitted to the decoder.

In existing HEVC, the temporal MVP is derived based on motion vectors from a respective area of a reference picture by mapping the current block from the current picture to the reference picture. The respective area, i.e., the co-located block, in the reference picture, i.e., the co-located picture, may not have the same block size (i.e., prediction unit (PU) size) as the current block. When the co-located block uses a smaller block size than the current block, one of the blocks in the co-located block is selected as a co-located reference block. In HM-2.0, the temporal predictor is associated with the center block of the respective area. The center block has the coordinates of its lower right corner mapped to the center of the current block. However, a block at the upper-left corner of the co-located block has been associated with the temporal prediction of AMVP in a previous version of HM. FIG. 1 illustrates the candidate set of MVPs used in HM-2.0, which includes two spatial MVPs and one temporal MVP:
1. Left predictor (the first MV available from E, $A_m, \ldots, A_0$),
2. Top predictor (the first available MV from C, $B_n, \ldots, B_0$, D), and
3. Temporal predictor $T_{ctr}$ (a temporal MV, found by mapping the center of the block to its co-located block).

Figure 2:
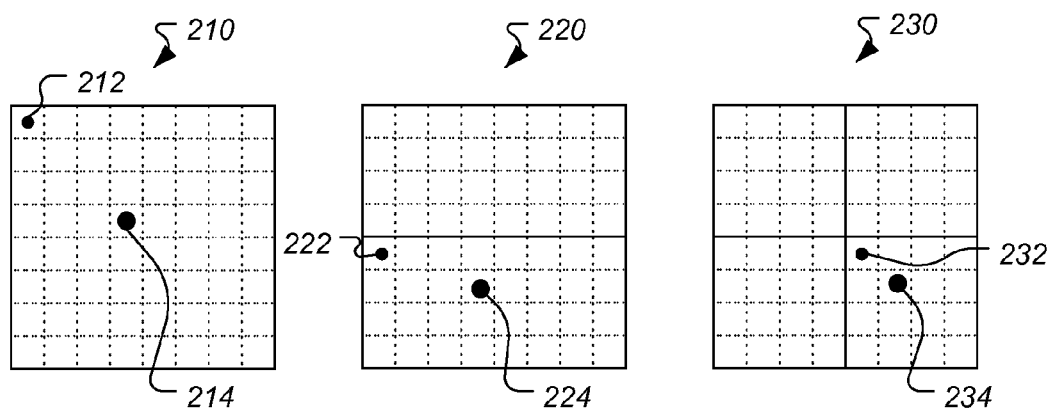
FIG. 2 illustrates an example of temporal predictor by mapping the center of the block to a co-located block instead of the origin of the block.

One MVP index is signaled to indicate which MVP from the candidate set is used. For the left predictor, the MVP is selected as the first available MV from the bottom block to top block which has the same reference picture index as the given reference picture index (it is set to 0 for Skip mode and is explicitly transmitted to the decoder for the Inter mode) and the same reference list as the given reference list. For the top predictor, it is selected as the first available MV which is not identical to the left predictor from the right block to the left block, which has the same reference picture index as the given reference picture index and the same reference picture list as the given reference list. The temporal predictor is determined by mapping the center of the block to a co-located picture, instead of the origin of the block (i.e., the upper left block of the respective area). The location of the center for 3 types of partitioning of a 32×32 CU, i.e., 2N×2N 210, 2N×N 220 and N×N 230, is shown in FIG. 2. The centers and origins of the blocks are indicated by reference numbers 214, 212, 224, 222, 234, and 232 respectively.

Figure 3:
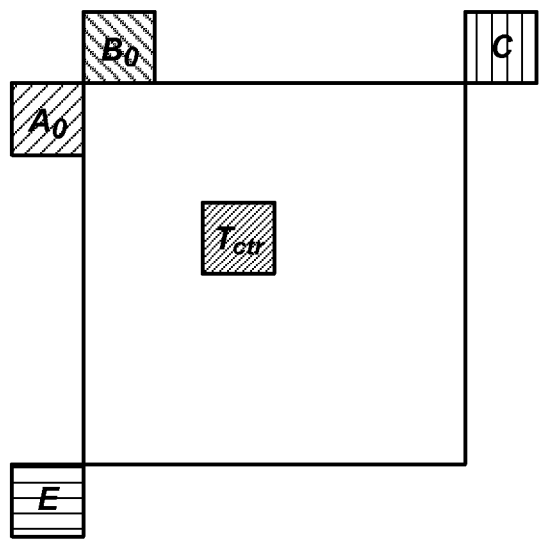
FIG. 3 illustrates neighboring block and co-located block configuration for deriving spatial/temporal motion vector prediction candidate set for Merge mode according to HM-2.0.

In HM-2.0, if a block is encoded as a Merge mode, one MVP index is signaled to indicate which MVP from the candidate set is used for this block to be merged. FIG. 3 illustrates the neighboring block configuration for deriving the MVP for Merge mode. The candidate set includes four spatial MVPs and one temporal MVP:
1. Left predictor ($A_0$),
2. Top predictor ($B_0$),
3. Temporal predictor $T_{ctr}$ (a temporal motion vector, found by mapping the center of the block to a co-located picture),
4. Right-Top predictor (C), and
5. Left-Bottom predictor (E).

Figure 4:
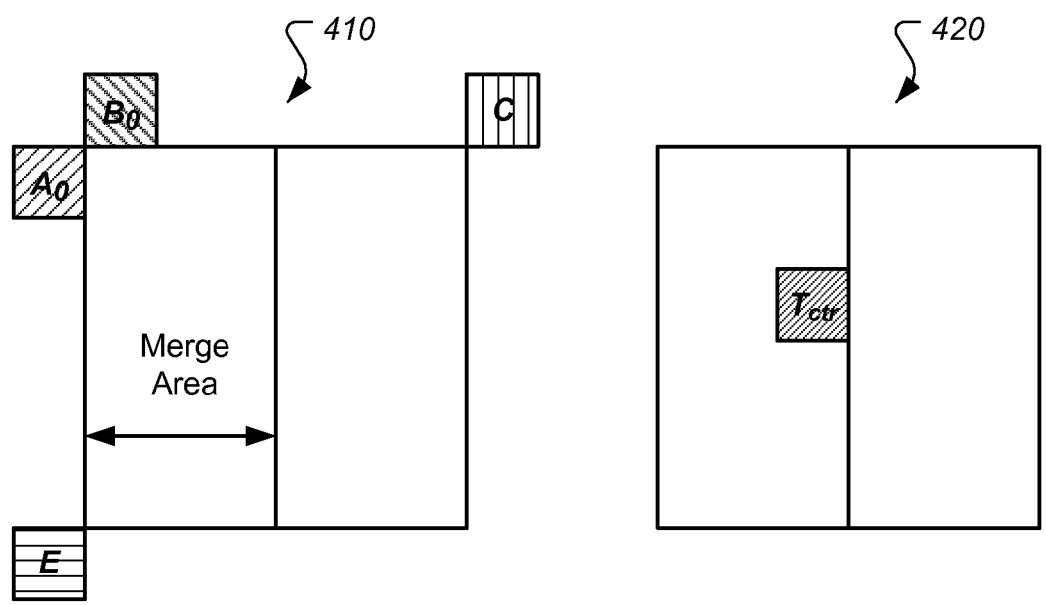
FIG. 4 illustrates neighboring block configuration for deriving spatial/temporal motion vector prediction candidate set for Merge mode for a first PU of an N×2N CU according to HM-2.0.
Figure 5:
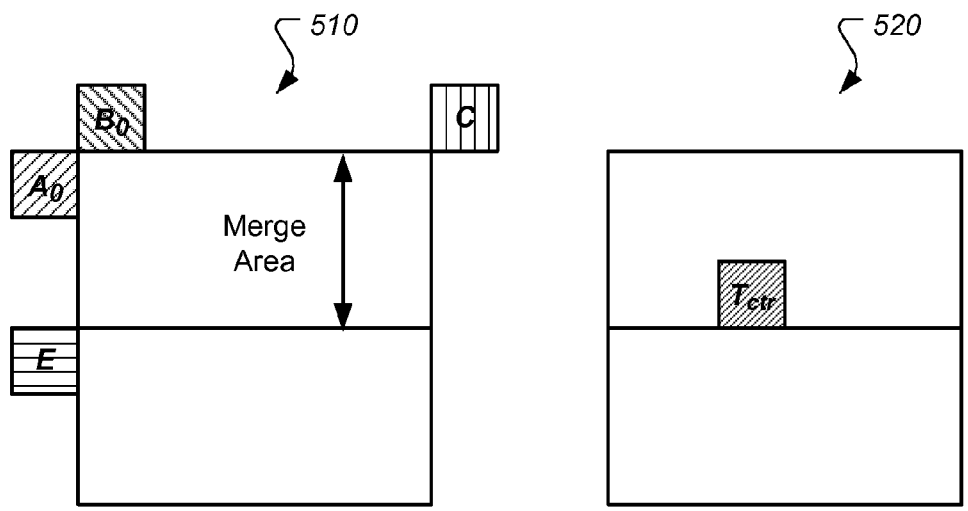
FIG. 5 illustrates neighboring block configuration for deriving spatial/temporal motion vector prediction candidate set for Merge mode for a first PU of a 2N×N CU according to HM-2.0.

For the spatial MVPs in Merge mode, the reference picture index will be set to the same as the reference picture index from the selected block. For example, if block C is selected according to the MVP index, the MV and the reference picture index from the block C are used for merge, i.e. the MV and reference picture index from block C are used for current PU. If the block has two MVs, the two MVs and their reference picture indices are used for bi-prediction. In particular, each CU can be merged as a whole (i.e. 2N×2N merge) or partially merged. If partition type N×2N or 2N×N is selected for Inter predicted CU, the first partition (i.e. PU) of this CU is forced to Merge mode. That is, the first PU of an N×2N or 2N×N CU will not have its own motion vector; instead, it has to share one of its neighboring blocks' motion vectors. At the meantime, the second PU of the N×2N or 2N×N CU can be either in Merge mode or Inter mode. The MVPs for partial merge of the first N×2N PU are shown in FIG. 4, where the spatial MVPs are indicated by reference number 410 and the temporal MVP is indicated by reference number 420. The MVPs for partial merge of the first 2N×N PU are shown in FIG. 5, where the spatial MVPs are indicated by reference number 510 and the temporal MVP is indicated by reference number 520.

Figure 6:
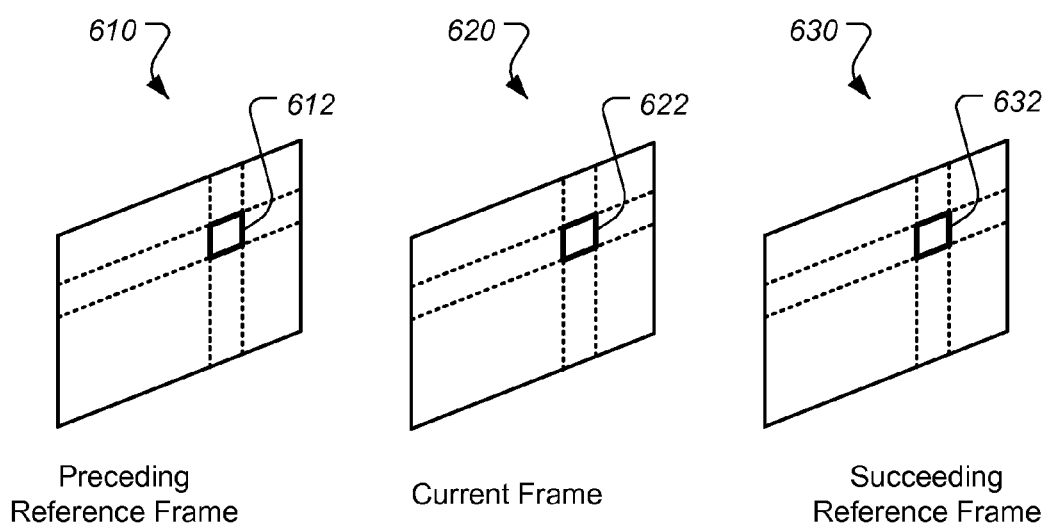
FIG. 6 illustrates an example of co-located blocks used to derive temporal motion vector prediction in the H.264 video coding standard.

Motion vector prediction is used to predict the motion vector of the current block, and is an important part of video coding. In general, the motion vector predictor (MVP), used in the result of motion vector prediction, is derived from spatial and temporal neighboring blocks. The temporal neighboring blocks usually means the blocks located at the same position in the nearest reference picture. For a B-picture, there may be more than one collocated block, as shown in FIG. 6. In H.264, the succeeding collocated block is implicitly selected to derive motion vector predictor. In this disclosure, we propose a new method for deriving a temporal motion vector predictor or a temporal motion vector predictor candidate. For simplicity, the same notations defined in H.264 are used such as reference picture lists 0 and 1 for indexing the reference pictures.

As mentioned before, in H.264, a current block may be predicted using motion-compensation based on a preceding reference picture and a succeeding reference for the B picture. Therefore, the temporal MVP can be based on the co-located picture selected from reference picture list 0 or list 1 as shown in FIG. 6. Corresponding co-located block 612 in preceding reference picture 610 or corresponding co-located block 632 in succeeding reference picture 630 can be used to derive the temporal MVP for current block 622 in current picture 620. In H.264, the succeeding collocated block is implicitly selected to derive the motion vector predictor. AMVP is an effective means for reducing the information associated with transmission of an underlying motion vector. The efficiency of AMVP depends on the availability of MVPs and the quality of the MVPs (i.e., accuracy of the MVP). When an MVP is not available, the underlying MV has to be transmitted without prediction or with a prediction value 0, a default value, or a pre-defined value. It is desirable to improve the MVP availability and quality. Therefore, extended temporal search scheme according to various embodiments of the present invention is disclosed. According to one embodiment of the present invention, a flag is used to indicate a co-located picture and the temporal MVP is derived based on the co-located block. Reference motion vectors associated with the co-located block are used to form a search set and the MVP is derived from the search set according to a search order.

Figure 7:
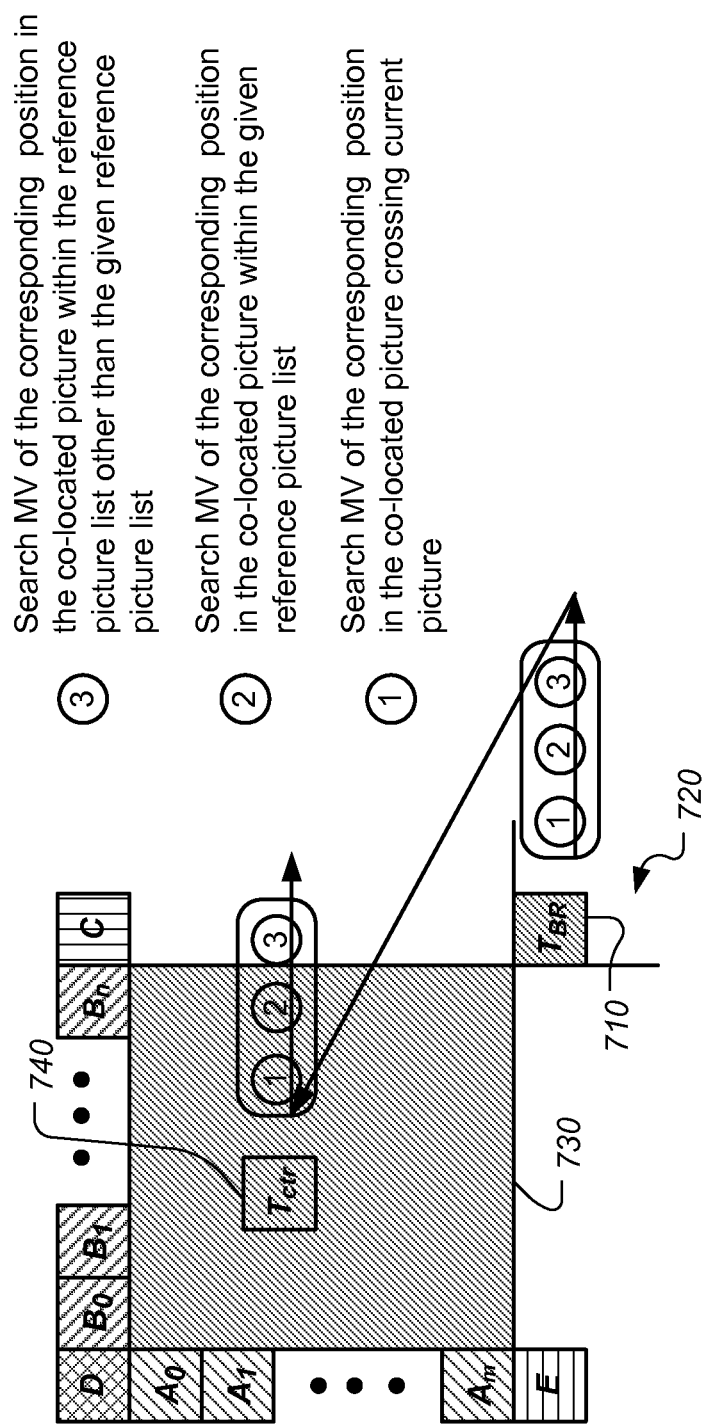
FIG. 7 illustrates an example of MVP derivation scheme incorporating an embodiment according to the present invention for Inter and Skip mode, where an exemplary search set and an exemplary search order are illustrated for deriving the temporal MVP.

FIG. 7 illustrates one embodiment according to the present invention, where the neighboring blocks ($A_0, \ldots, A_m$, $B_0, \ldots, B_n$, C, D, E) are used to derived the spatial MVP, and $T_{BR}$ and $T_{ctr}$ associated with the co-located blocks are used to derive the temporal MVP for Inter and Skip modes. A conventional method always uses a block within co-located block 730 to derive the temporal MVP. The example illustrated in FIG. 7 also uses a block outside co-located block 730 to derive the temporal MVP. In additional, more than one block can be used to derive the temporal MVP, such as an inside block and an outside while the conventional approach always uses a single co-located block. FIG. 7 illustrates an example of center block $T_{ctr}$ as the inside block and block $T_{BR}$ adjacent to the bottom-right corner of the co-located block as the outside block. The blocks associated with the co-located block and neighboring blocks of the co-located block for temporal MVP derivation are referred to as co-located reference blocks in this disclosure. A block inside the co-located block for deriving the temporal MVP is referred to as an inside co-located block in this disclosure. Similarly, a block outside the co-located block for deriving the temporal MVP is referred to as an outside co-located block in this disclosure. The motion vectors for the co-located reference blocks are received to derive the temporal MVP. There may be more than one motion vector for each of the co-located reference blocks. For example, for a B picture, one motion vector may be pointing to a picture in reference list 0 and another motion vector may be pointing to a picture in reference list 1. The motion vectors for the co-located reference blocks are referred to as reference motion vectors (MVs) in this disclosure.

A search set is determined based on the co-located reference blocks, and a search order is used for determining the temporal MVP. In the example of FIG. 7, the reference MV(s) of co-located reference block $T_{BR}$ is first searched if $T_{BR}$ exists, then the reference MV(s) of co-located reference block $T_{ctr}$ is searched for determining the temporal MVP. The search set comprises search MV(s) associated with one or more co-located reference blocks, and wherein each co-located reference block is associated with one or more search MVs. For example, co-located reference block $T_{BR}$ has two MVs, one MV pointing to a reference picture in list 0 and another MV pointing to a reference picture in list 1. Various search sets may be formed in various embodiments according to the present invention to determine the temporal MVP. Similarly, various search orders may be formed in various embodiments according to the present invention to determine the temporal MVP. The search set shown in FIG. 7 comprises the search MVs associated with co-located reference blocks $T_{BR}$ and $T_{ctr}$. A search MV that crosses the current picture, a search MV corresponding to the co-located reference block pointing to a reference picture in the given reference list, and a search MV corresponding to the co-located reference block pointing to a reference picture in the other reference list are searched in order. The search order shown in FIG. 7 is from the search MV crossing the current picture, to the search MV corresponding to the reference block pointing to a reference picture in the given reference list, and to the search MV corresponding to the reference block pointing to a reference picture in the other reference list. In one embodiment according to the present invention, the search MV crossing the current picture is always assigned higher priority, and this MV is selected as the temporal MVP if there is only one MV crosses the current picture. If both MVs in list 0 and list 1 cross the current picture, or none of the MVs crosses the current picture, the search MV corresponding to the co-located reference block pointing to a reference picture in the given reference list is selected as the temporal MVP. If the search MV corresponding to the co-located reference block pointing to a reference picture in the given reference list is absent, the search MV corresponding to the co-located reference block pointing to a reference picture in the other reference list is selected as the temporal MVP. In other words, the search MV corresponding to the other reference list will only be selected if the co-located reference block is uni-prediction, which only has one MV that is corresponding to the other reference list. Accordingly, the search MVs being assigned with the first search priority are referred to as first search MVs in this disclosure. On the other hand, the search MVs being assigned with the second search priority are referred to as second search MV in this disclosure. In the example of FIG. 7, if there exists one motion vector $MV_{BR}$ for $T_{BR}$ and there exists one motion vector $MV_{ctr}$ for $T_{ctr}$. The search scheme according to FIG. 7 will select $MV_{BR}$ as the temporal MVP. In order to properly use $MV_{BR}$ as the temporal MVP, $MV_{BR}$ has to be scaled according to the temporal distances associated with the current MV and the select MVP, $MV_{BR}'$.

In some other embodiments, whether the MVs cross the current picture is not considered, so the search order of FIG. 7 becomes first searching the MV of $T_{BR}$ corresponding to the given reference picture list, if $T_{BR}$ is uni-prediction and only has MV within the other reference picture list, searching the MV of $T_{BR}$ corresponding to the other reference picture list. In the case when co-located block $T_{BR}$ doesn't exist, the search order searches the MV of $T_{ctr}$ corresponding to the given reference picture list, then the MV of $T_{ctr}$ corresponding to the other reference picture list.

There are various methods for deriving the spatial MVP based on neighboring blocks. For example, the AMVP scheme by McCann et al., entitled "Samsung's Response to the Call for Proposals on Video Compression Technology", Document JCTVC-A124, Joint Collaborative Team on Video Coding (JCT-VC) of ITU-T SG16 WP3 and ISO/IEC JTC1/SC29/WG1, 1st Meeting: Dresden, Germany, 15-23 Apr. 2010 describes a method of deriving the spatial MVP based on the neighboring blocks on the left and neighboring blocks on the top. An improved method for derivation of spatial MVP based on neighboring blocks is disclosed in the U.S. patent application Ser. No. 13/177,808, entitled "Method and Apparatus for Derivation of Spatial Motion Vector Candidate and Motion Vector Prediction Candidate", filed Jul. 7, 2011. The temporal MVP derivation incorporating an embodiment according to the present invention may be used with any spatial MVP derivation scheme for spatial/temporal MVP derivation.

Figure 8:
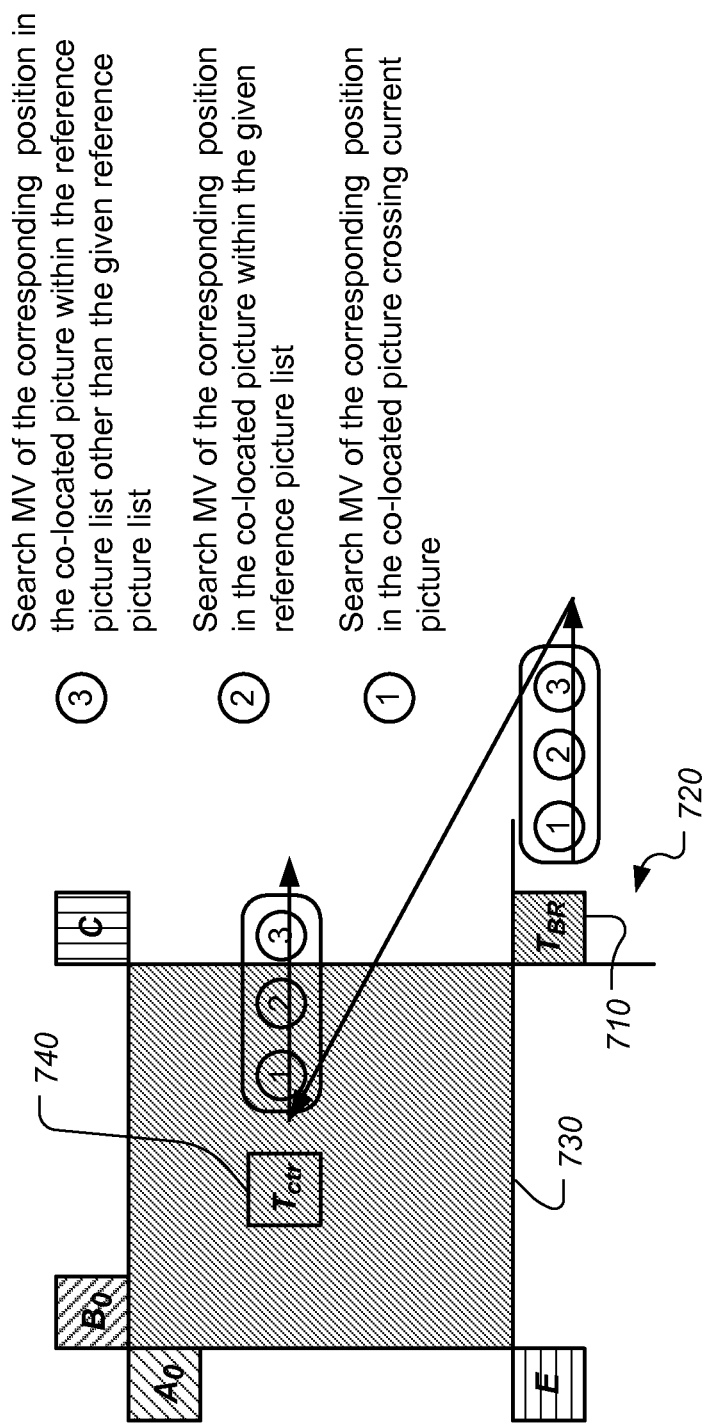
FIG. 8 illustrates an example of MVP derivation scheme incorporating an embodiment according to the present invention for Merge mode, where an exemplary search set and an exemplary search order are illustrated for deriving the temporal MVP.

FIG. 8 illustrates neighboring block and co-located block configuration for deriving spatial/temporal motion vector prediction candidate set for Merge mode according to an embodiment of the present invention. The same search set and the same search order as those of FIG. 7 are used for Merge mode. While the specific co-located reference blocks, i.e. $T_{BR}$ and $T_{ctr}$, are used as an example of co-located reference blocks, other blocks within the co-located block and its neighboring blocks may also be used as the co-located reference blocks. Furthermore, three search MVs for each co-located reference block are used as an example. However, more or less search MVs can be used for each co-located reference block. Furthermore, not every co-located reference block has to include multiple search MVs. For example, co-located reference block $T_{BR}$ may include the search MVs labeled as 1, 2 and 3 while co-located reference block $T_{ctr}$ may include only one search MV labeled as 1 in FIG. 7 and FIG. 8. Furthermore, the particular search order illustrated in FIG. 7 and FIG. 8 starts with the search motion vector crossing the current picture, then searches the search motion vector pointing to a reference picture in the given reference picture list. If the MVP still cannot be found, the search order goes to the search MV pointing to a reference picture in the other reference picture list is searched. Nevertheless, other search order may also be used.

Figure 9:
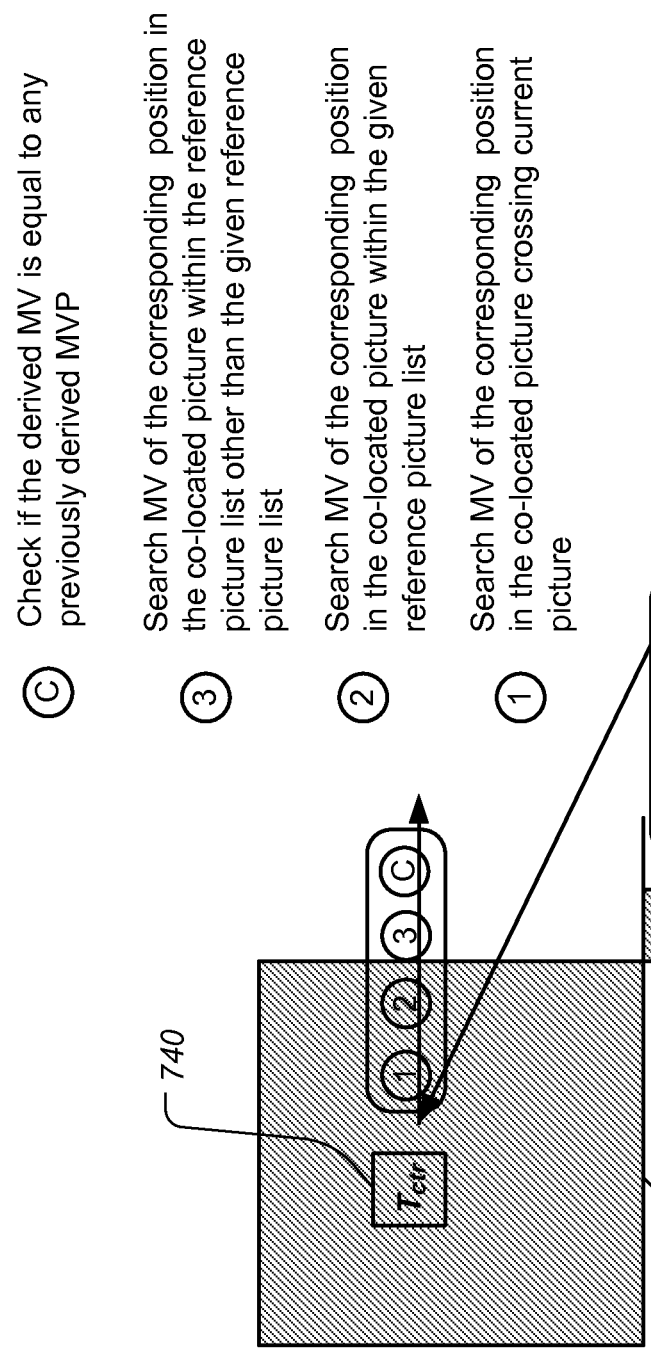
FIG. 9 illustrates an example of MVP derivation scheme incorporating another embodiment according to the present invention, where an exemplary search set and an exemplary search order are illustrated for deriving the temporal MVP.

FIG. 9 illustrates an example of MVP derivation scheme incorporating another embodiment according to the present invention, where an exemplary search set and an exemplary search order are illustrated for deriving a temporal MVP. The scheme of temporal MVP derivation is similar to the scheme shown in FIG. 7 except that the MVP found from the collocated reference block, $T_{BR}$ is compared with one or more previous MVP. The previous MVP(s) can be any previously derived MVP in the candidate set of MVPs for determining the final MVP, for example, the previous MVP can be a previously derived spatial MVP. If the MVP found is the same as a previous MVP, the search of the temporal MVP continues on the other collocated reference block, for example, $T_{ctr}$. If an MVP is found, the MVP is compared with the previous MVP(s). If the MVP found is again the same as a previous MVP, the MVP is set to zero or a default value, or the MVP is simply removed from the candidate set (i.e. temporal MVP is not available).

Figure 10:
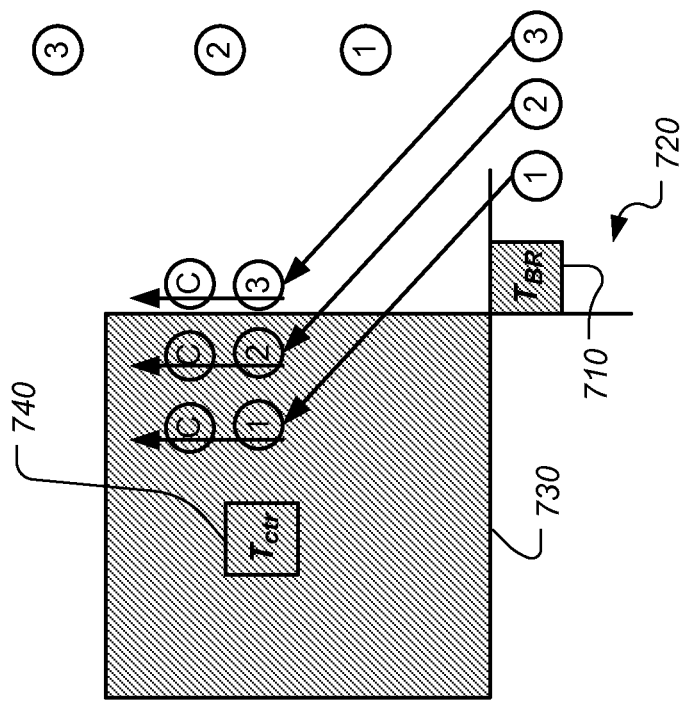
FIG. 10 illustrates an example of MVP derivation scheme incorporating yet another embodiment according to the present invention, where an exemplary search set and an exemplary search order are illustrated for deriving the temporal MVP.

FIG. 10 illustrates an example of MVP derivation scheme incorporating yet another embodiment according to the present invention, where an exemplary search set and an exemplary search order are illustrated for deriving a temporal MVP. While the search order shown in FIG. 9 searches through all search MVs associated with each co-located reference block before moving to the next co-located reference block, FIG. 10 illustrates another search order. The search order shown in FIG. 10 searches the first search MV through all co-located reference blocks. If an MVP is found, the MVP is compared with a previous MVP. If the MVP found is the same as the previous MVP or no MVP is found, the search of temporal MVP continues to search the next search MV through all co-located reference blocks. After all search MVs are searched, if an MVP is found, the MVP is compared with a previously found MVP. If the MVP found is the same as the previous MVP or no MVP is found, the MVP is set to zero, a default value, or a pre-defined value, or the MVP is simply removed from the candidate set (i.e. temporal MVP is not available). In the spatial/temporal MVP derivation scheme, the spatial MVP is often determined before the temporal MVP. Therefore, the previous MVP can be any of the spatial MVP determined at the beginning of the temporal MVP derivation.

Figure 11:
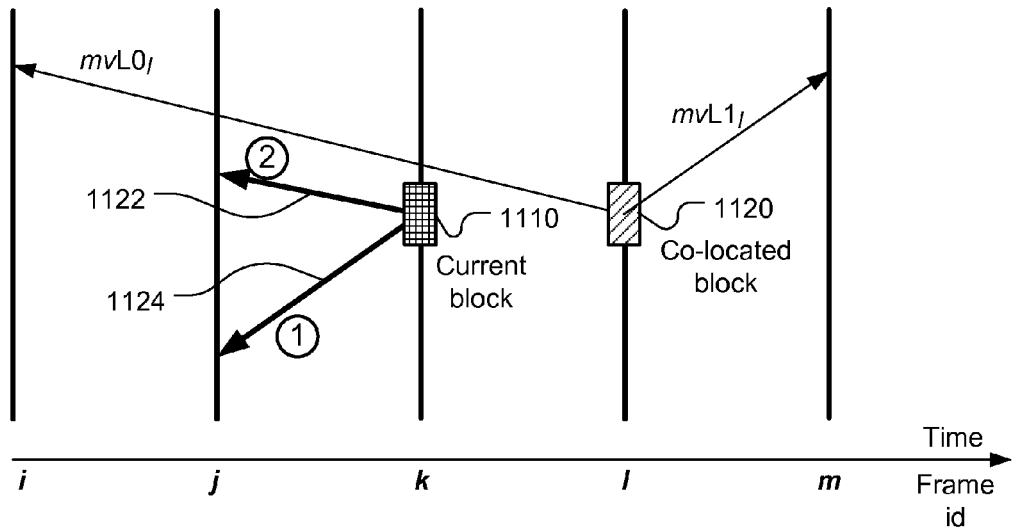
FIG. 11 illustrates an example of motion vector prediction incorporating an embodiment according to the present invention, where the MVP for the current block is derived by scaling co-located reference motion vectors of a co-located picture.

FIG. 11 illustrates an example of motion vector prediction incorporating an embodiment according to the present invention using scaled motion vectors derived from the co-located block. In FIG. 11, the current picture having current block 1110 is labeled with picture index k. The target reference picture is labeled with picture index j. Picture l is the co-located picture selected to determine co-located block 1120. The reference picture list of the current block is assumed to be list 1. There are two co-located reference MVs, i.e., $mvL0_l$ and $mvL1_l$, where $mvL0_l$ points to a reference picture in list 0 and $mvL1_l$ points to a reference picture in list 1. Therefore, $mvL1_l$ points to a reference picture in the same reference list as the current block while $mvL0_l$ points to a reference picture in a different reference list. Reference MV $mvL0_l$ is from picture l to picture i. Therefore, reference MV $mvL0_l$ goes across the current picture k as shown in FIG. 11. The temporal MVP can be derived according to a search order. The example shown in FIG. 11 assigns a higher search priority to the search MV in the same reference list. Accordingly, scaled motion vector 1124 corresponding to $mvL1_l$ pointing to the reference picture in the same reference list is selected over scaled motion vector 1122 corresponding to $mvL0_l$ pointing to a reference picture in the other reference list. The scaled motion vector can be derived from the respective reference motion vector according to a first temporal distance associated with the selected MVP and a second temporal distance associated with the current target reference picture. In the example of FIG. 11, the temporal distance associated with $mvL1_l$ can be computed according to the difference in associated picture indexes, i.e., |m-l|. On the other hand, the temporal distance associated with the current target reference picture can be computed according to the difference in associated picture indexes, i.e., |k-j|. An example of deriving scaled motion vector is described in "Direct Mode Coding for Biprediction Slices in the H.264 Standard", authored by Tourapis et al., in *IEEE Trans. on Circuits and Systems for Video Technology*, Vol. 15, No. 1, pp. 119-126, January 2005.

Figure 12:
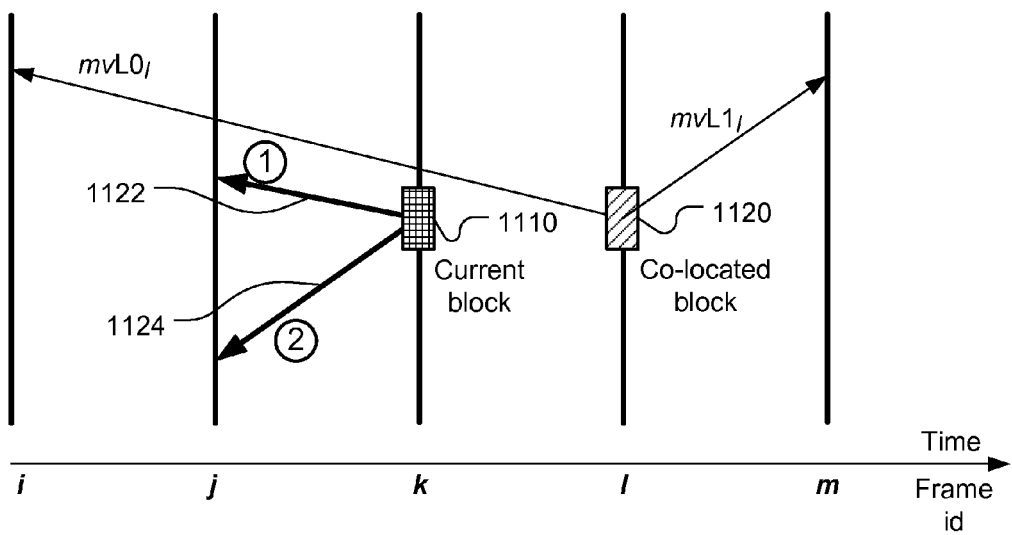
FIG. 12 illustrates another example of motion vector prediction incorporating an embodiment according to the present invention, where the MVP for the current block is derived by scaling co-located reference motion vectors of a co-located picture.

FIG. 12 illustrates another example of motion vector prediction using scaled motion vectors derived from a co-located block, where the MVP is selected according to an alternative search order. While the search order of FIG. 11 assigns a higher search priority to the search MV pointing to a picture in the same reference list than the search MV pointing to a picture in the other reference list, the search order of FIG. 12 assigns an even higher search priority to the search MV crossing the current picture. Accordingly, scaled motion vector 1122 corresponding to $mvL0_l$ crossing the current picture is selected.

The reference picture selected to determine co-located block, i.e., the co-located picture, can be implicitly or explicitly determined. A flag can be incorporated in the bitstream to indicate whether an implicit method or an explicit method is used. The information associated with the flag can be incorporated in sequence level, picture level, or slice level. The use of implicit method has the advantage of low side information or no side information associated with the reference picture selection. When the implicit method is used, the selection method for the co-located picture associated with the co-located block can be determined according to the given reference list. For example, if the current picture is in reference list 0, the co-located picture associated with the co-located block is selected from reference list 1. On the other hand, if the current picture is in reference list 1, the co-located picture associated with the co-located block is selected from reference list 0. When the implicit method is used, the selection method for the co-located picture associated with the co-located block can be based on the temporal distance associated with the reference MVs. Furthermore, the selection method selects the co-located picture, wherein the reference MVs associated with the co-located picture have a shortest temporal distance. In one embodiment according to the present invention, the selection method for the co-located picture associated with the co-located block is based on a picture type of the co-located picture if the flag indicates the implicit method. In another embodiment according to the present invention, the selection method for the co-located picture associated with the co-located block is based on a layer of the co-located picture in a hierarchical group of pictures (GOP), or a picture order of the co-located picture in a GOP, or the picture order of the co-located picture in a same layer as the hierarchical GOP if the flag indicates the implicit method.

In this disclosure, exemplary configurations of co-located reference blocks have been provided to illustrate embodiments according to the present invention. While separate exemplary configurations have been provided for the Inter/Skip mode and Merge mode, the exemplary configuration for the Inter/Skip mode is applicable to Merge mode, and vice versa. In addition, separate exemplary search schemes have been provided for the Inter/Skip mode and Merge mode. However, the search scheme for the Inter/Skip mode is applicable to Merge mode, and vice versa. Furthermore, while several configurations of co-located reference blocks are illustrated as examples, a skilled person in the field may practice the present invention using other configurations with departing from the spirit of the present invention.

Embodiment of MVP derivation according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of deriving a motion vector predictor (MVP) for a current motion vector (MV) of a current block of a current picture in Inter, or Merge, or Skip mode, wherein the current MV is associated with the current block and a corresponding block of a target reference picture in a given reference list, the method comprising:
   selecting a co-located temporal block corresponding to a co-located temporal picture;
   determining one or more co-located temporal reference blocks associated with the co-located temporal block, wherein each co-located temporal reference block is either inside or outside the co-located temporal block;
   receiving one or more reference motion vectors (MVs) of said one or more co-located temporal reference blocks associated with the co-located temporal block, wherein said one or more reference MVs are previously determined prior to coding the current block;
   determining the MVP for the current block based on a search set comprising said one or more reference MVs according to a search order associated with one or more attributes associated with said one or more reference MVs, wherein said one or more attributes are selected from an attribute group comprising of: an inside/outside attribute consisting of an inside attribute and an outside attribute, wherein the inside/outside attribute corresponds to a first co-located temporal reference block associated with a second reference MV being inside or outside the co-located temporal block, and said one or more reference MVs having the outside attribute with a higher priority than said one or more reference MVs having the inside attribute such that a reference MV of an outside co-located temporal reference block is included in the search set for determining the MVP and where another reference MV of an inside co-located temporal reference block is included in the search set only when the outside co-located temporal reference block is not available; and providing the MVP for the current block, wherein said one or more co-located temporal reference blocks comprise one or both of the inside co-located temporal reference block at a center of the co-located temporal block and the outside co-located temporal reference block outside the co-located temporal block and adjacent to a lower-right corner of the co-located temporal block; and wherein said determining the MVP comprises:

selecting the second reference MV associated with the outside collocated temporal reference block to derive the MVP when the second reference MV associated with the outside co-located temporal reference block exists;

selecting the second reference MV associated with the inside collocated temporal reference block to derive the MVP when the second reference MV associated with the outside co-located temporal reference block does not exist; and wherein said selecting the second reference MV associated with the outside co-located temporal reference block and said selecting the second reference MV associated with the inside co-located temporal reference block are performed before at least one other checking step.

2. The method of claim 1, wherein the co-located temporal picture associated with the co-located temporal block is indicated by a flag, and information associated with the flag is incorporated in sequence level, picture level, or slice level.

3. The method of claim 1, wherein the co-located temporal picture associated with the co-located temporal block is derived according to an implicit method or an explicit method as indicated by a flag.

4. The method of claim 1, wherein selection method for the collocated temporal picture associated with the co-located temporal block is determined according to the given reference list.

5. The method of claim 4, wherein the selection method selects a reference list different from the given reference list.

6. The method of claim 1, wherein said one or more attributes associated with said one or more reference MVs further comprises temporal distance associated with a second co-located temporal reference block associated with a third reference MV.

7. The method of claim 6, wherein a third co-located temporal reference block having a shortest temporal distance to the target reference picture is selected as the MVP for the current block.

8. The method of claim 1, wherein the attribute group further comprises a picture type of the co-located temporal picture, and wherein said one or more attributes associated with said one or more reference MVs corresponds to the picture type of the co-located temporal picture.

9. The method of claim 1, wherein the attribute group further comprises a layer of the co-located temporal picture in a hierarchical group of pictures (GOP), a picture order of the co-located temporal picture in a GOP, or the picture order of the co-located temporal picture in a same layer as the hierarchical GOP; and wherein said one or more attributes associated with said one or more reference MVs corresponds to the layer of the co-located temporal picture in the hierarchical group of pictures (GOP), or the picture order of the collocated temporal picture in the GOP, or the picture order of the co-located temporal picture in a same layer as the hierarchical GOP.

10. The method of claim 1, wherein the outside attribute has a higher search priority than the inside attribute according to the search order, and said determining the MVP selects the second reference MV associated with the inside co-located temporal reference block to derive the MVP when the second reference MV associated with the outside co-located temporal reference block does not exist.

11. The method of claim 1, wherein the attribute group further comprises a reference list attribute consists of a given reference list attribute and an other reference list attribute, wherein the reference list attribute is associated with a first reference picture pointed by a first reference MV of said one or more reference MVs and the given reference list attribute has a higher search priority than the other reference list attribute according to the search order.

12. The method of claim 11, wherein said determining the MVP checks whether the first reference picture pointed by the first reference MV is in the given reference list, and when the first reference MV is not available, said determining the MVP further checks whether the first reference picture pointed by the first reference MV is in the other reference list.

13. The method of claim 12, wherein said determining the MVP checks one or more reference MVs associated with a second co-located temporal reference block of the co-located temporal block when said determining the MVP finds no MVP after said determining the MVP further checks whether the first reference picture pointed by the first reference MV is in the other reference list or when the MVP found is the same as a previous MVP derived for the current block.

14. The method of claim 13, wherein the MVP is set to zero, a default value or a pre-defined value, or removed from a candidate set of MVPs, if no MVP is found or the MVP found is the same as the previous MVP after said determining the MVP checks said one or more reference MVs associated with the second co-located temporal reference block of the co-located temporal block.

15. The method of claim 1, the MVP is set to zero, a default value or a pre-defined value, or removed from a candidate set of MVPs if no MVP is found or the MVP found is the same as a previous MVP.

16. The method of claim 1, wherein the MVP is scaled according to a first temporal distance associated with the MVP selected and a second temporal distance associated with the current MV.

17. A method of deriving a motion vector predictor (MVP) for a current motion vector (MV) of a current block of a current picture in Inter, or Merge, or Skip mode, wherein the current MV is associated with the current block and a corresponding block of a target reference picture in a given reference list, the method comprising:

selecting a co-located temporal block corresponding to a co-located temporal picture;

determining one or more co-located temporal reference blocks associated with the co-located temporal block, wherein each co-located temporal reference block is either inside or outside the co-located temporal block;

receiving one or more reference motion vectors (MVs) of said one or more co-located temporal reference blocks associated with the co-located temporal block,
wherein said one or more reference MVs are previously determined prior to coding the current block;
determining the MVP for the current block based on a search set comprising said one or more reference MVs according to a search order associated with one or more attributes associated with said one or more reference MVs, wherein said one or more attributes are selected from an attribute group comprising of: an inside/outside attribute consisting of an inside attribute and an outside attribute, wherein the inside/outside attribute corresponds to a first co-located temporal reference block associated with a second reference MV being inside or outside the co-located temporal block, and said one or more reference MVs having the outside attribute with a higher priority than said one or more reference MVs having the inside attribute such that a reference MV of an outside co-located temporal reference block is included in the search set for determining the MVP and where another reference MV of an inside co-located temporal reference block is included in the search set only when the outside co-located temporal reference block is not available; and
providing the MVP for the current block, wherein said one or more co-located temporal reference blocks comprise one or both of the inside co-located temporal reference block at a center of the co-located temporal block and the outside co-located temporal referenced block outside the co-located temporal block and adjacent to a lower-right corner of the co-located temporal block; wherein said determining the MVP comprises:
selecting the second reference MV associated with the outside collocated temporal reference block to derive the MVP when the second reference MV associated with the outside co-located temporal reference block exists;
selecting the second reference MV associated with the inside collocated temporal reference block to derive the MVP when the second reference MV associated with the outside co-located temporal reference block does not exist; and
wherein said selecting the second reference MV associated with the outside co-located temporal reference block and said selecting the second reference MV associated with the inside co-located temporal reference block are performed after at least one other checking step.

18. The method of claim 17, wherein the co-located temporal picture associated with the co-located temporal block is indicated by a flag, and information associated with the flag is incorporated in sequence level, picture level, or slice level.

19. The method of claim 17, wherein the co-located temporal picture associated with the co-located temporal block is derived according to an implicit method or an explicit method as indicated by a flag.

20. The method of claim 17, wherein selection method for the collocated temporal picture associated with the co-located temporal block is determined according to the given reference list.

21. The method of claim 20, wherein the selection method selects a reference list different from the given reference list.

22. The method of claim 17, wherein said one or more attributes associated with said one or more reference MVs further comprises temporal distance associated with a second co-located temporal reference block associated with a third reference MV.

23. The method of claim 22, wherein a third co-located temporal reference block having a shortest temporal distance to the target reference picture is selected as the MVP for the current block.

24. The method of claim 17, wherein the attribute group further comprises a picture type of the co-located temporal picture, and wherein said one or more attributes associated with said one or more reference MVs corresponds to the picture type of the co-located temporal picture.

25. The method of claim 17, wherein the attribute group further comprises a layer of the co-located temporal picture in a hierarchical group of pictures (GOP), a picture order of the co-located temporal picture in a GOP, or the picture order of the co-located temporal picture in a same layer as the hierarchical GOP; and wherein said one or more attributes associated with said one or more reference MVs corresponds to the layer of the co-located temporal picture in the hierarchical group of pictures (GOP), or the picture order of the collocated temporal picture in the GOP, or the picture order of the co-located temporal picture in a same layer as the hierarchical GOP.

26. The method of claim 17, wherein the outside attribute has a higher search priority than the inside attribute according to the search order, and said determining the MVP selects the second reference MV associated with the inside co-located temporal reference block to derive the MVP when the second reference MV associated with the outside co-located temporal reference block does not exist.

27. The method of claim 17, wherein the attribute group further comprises a reference list attribute consists of a given reference list attribute and an other reference list attribute, wherein the reference list attribute is associated with a first reference picture pointed by a first reference MV of said one or more reference MVs and the given reference list attribute has a higher search priority than the other reference list attribute according to the search order.

28. The method of claim 27, wherein said determining the MVP checks whether the first reference picture pointed by the first reference MV is in the given reference list, and when the first reference MV is not available, said determining the MVP further checks whether the first reference picture pointed by the first reference MV is in the other reference list.

29. The method of claim 28, wherein said determining the MVP checks one or more reference MVs associated with a second co-located temporal reference block of the co-located temporal block when said determining the MVP finds no MVP after said determining the MVP further checks whether the first reference picture pointed by the first reference MV is in the other reference list or when the MVP found is the same as a previous MVP derived for the current block.

30. The method of claim 29, wherein the MVP is set to zero, a default value or a pre-defined value, or removed from a candidate set of MVPs, if no MVP is found or the MVP found is the same as the previous MVP after said determining the MVP checks said one or more reference MVs associated with the second co-located temporal reference block of the co-located temporal block.

31. The method of claim 17, the MVP is set to zero, a default value or a pre-defined value, or removed from a candidate set of MVPs if no MVP is found or the MVP found is the same as a previous MVP.

32. The method of claim 17, wherein the MVP is scaled according to a first temporal distance associated with the MVP selected and a second temporal distance associated with the current MV.

33. An apparatus for deriving a motion vector predictor (MVP) for a current motion vector (MV) of a current block of a current picture in Inter, or Merge, or Skip mode, wherein the current MV is associated with the current block and a corresponding block of a target reference picture in a given reference list, the apparatus comprising at least one circuit configured for:

selecting a co-located temporal block corresponding to a co-located temporal picture;

determining one or more co-located temporal reference blocks associated with the co-located temporal block, wherein each co-located temporal reference block is being inside or outside the co-located temporal block;

receiving one or more reference motion vectors (MVs) of said one or more collocated temporal reference blocks associated with the co-located temporal block, wherein said one or more reference MVs are previously determined prior to coding the current block;

determining the MVP for the current block based on a search set comprising said one or more reference MVs according to a search order associated with one or more attributes associated with said one or more reference MVs, wherein said one or more attributes are selected from an attribute group comprising of: an inside/outside attribute consisting of an inside attribute and an outside attribute, wherein the inside/outside attribute corresponds to a first co-located temporal reference block associated with a second reference MV being inside or outside the co-located temporal block, and said one or more reference MVs having the outside attribute with a higher priority than said one or more reference MVs having the inside attribute such that a reference MV of an outside co-located temporal reference block is included in the search set for determining the MVP and where another reference MV of an inside co-located temporal reference block is included in the search set only when the outside co-located temporal reference block is not available; and providing the MVP for the current block, wherein said one or more co-located temporal reference blocks comprise one or both of the inside co-located temporal reference block at a center of the co-located temporal block and the outside co-located temporal reference block outside the co-located temporal block and adjacent to a lower-right corner of the co-located temporal block; and wherein said determining the MVP comprises: p1 selecting the second reference MV associated with the outside collocated temporal reference block to derive the MVP when the second reference MV associated with the outside co-located temporal reference block exists;

selecting the second reference MV associated with the inside collocated temporal reference block to derive the MVP when the second reference MV associated with the outside co-located temporal reference block does not exist; and wherein said selecting the second reference MV associated with the outside co-located temporal reference block and said selecting the second reference MV associated with the inside co-located temporal reference block are performed before at least one other checking step.

34. The apparatus of claim 33, wherein the co-located temporal picture associated with the co-located temporal block is indicated by a flag, and information associated with the flag is incorporated in a sequence level, a picture level, or a slice level.

35. An apparatus for deriving a motion vector predictor (MVP) for a current motion vector (MV) of a current block of a current picture in Inter, or Merge, or Skip mode, wherein the current MV is associated with the current block and a corresponding block of a target reference picture in a given reference list, the apparatus comprising at least one circuit configured for:

selecting a co-located temporal block corresponding to a co-located temporal picture;

determining one or more co-located temporal reference blocks associated with the co-located temporal block, wherein each co-located temporal reference block is being inside or outside the co-located temporal block;

receiving one or more reference motion vectors (MVs) of said one or more collocated temporal reference blocks associated with the co-located temporal block, wherein said one or more reference MVs are previously determined prior to coding the current block;

determining the MVP for the current block based on a search set comprising said one or more reference MVs according to a search order associated with one or more attributes associated with said one or more reference MVs, wherein said one or more attributes are selected from an attribute group comprising of: an inside/outside attribute consisting of an inside attribute and an outside attribute, wherein the inside/outside attribute corresponds to a first co-located temporal reference block associated with a second reference MV being inside or outside the co-located temporal block, and said one or more reference MVs having the outside attribute with a higher priority than said one or more reference MVs having the inside attribute such that a reference MV of an outside co-located temporal reference block is included in the search set for determining the MVP and where another reference MV of an inside co-located temporal reference block is included in the search set only when the outside co-located temporal reference block is not available; and providing the MVP for the current block, wherein said one or more co-located temporal reference blocks comprise one or both of the inside co-located temporal reference block at a center of the co-located temporal block and the outside co-located temporal referenced block outside the co-located temporal block and adjacent to a lower-right corner of the co-located temporal block; wherein said determining the MVP comprises:

selecting the second reference MV associated with the outside collocated temporal reference block to derive the MVP when the second reference MV associated with the outside co-located temporal reference block exists;

selecting the second reference MV associated with the inside collocated temporal reference block to derive the MVP when the second reference MV associated with the outside co-located temporal reference block does not exist; and wherein said selecting the second reference MV associated with the outside co-located temporal reference block and said selecting the second reference MV associated with the inside co-located temporal reference block are performed after at least one other checking step.

* * * * *